Patented Oct. 21, 1941

2,260,123

UNITED STATES PATENT OFFICE 2,260,123

PROCESS FOR THE MANUFACTURE OF WASHING MATERIALS

Max Nassau, New York, N. Y.

No Drawing. Application April 26, 1939, Serial No. 270,153

2 Claims. (Cl. 252—135)

This invention relates to a process for the manufacture of washing materials, and to the washing material obtained by my novel process. More particularly the present invention relates to a process for the manufacture of washing materials containing a condensation product of an albuminous matter i. e. an albumin or an albumin decomposition product with higher fatty acids and to the washing materials obtained thereby.

Accordingly, it is the main object of the invention to improve the quality of washing materials containing a condensation product of an albuminous matter with a higher fatty acid by adding a cellulose ether to this condensation product.

It is a further object of the invention to manufacture a washing material having a neutral or slightly acid reaction.

It is still another object of the invention to manufacture a washing material having the form of soap-cakes which are not used up faster than ordinary cakes and which may advantageously be used with water containing lime.

Condensation products of an albuminous matter with higher fatty acids are obtained as aqueous solutions. So far it has not been possible to separate the condensation products from their aqueous solutions and to press the same into cakes similar in appearance and in use to a good toilet soap-cake.

If an aqueous solution of the above mentioned condensation products is dried a sticky and hygroscopic material is formed which can not be shaped. Neither can useful shaped products be produced if these condensation products are precipitated by means of acid and thereafter isolated.

I have found that condensation products of an albuminous matter with higher fatty acids which are precipitated by means of an acid may be shaped into cakes if they are treated with a cellulose ether preferably a water soluble cellulose ether. For said purpose as albuminous matter albumins such as gelatine, glue, casein and albumin decomposition products such as lysalbinic acid, protalbinic acid, lysine, arginine, glycocoll tyrosine may be used. As higher fatty acids lauric acid, palmiti acid, stearic acid, olein respectively naturally occurring mixtures of higher fatty acids are adapted.

Cellulose ethers adapted for the above mentioned purposes are the following: methyl cellulose, ethyl cellulose, benzyl cellulose and further what is known as mixed ethers containing different radicals. The mixed ether known under the trade name "Tylose" may also be used. I prefer the mixed ethers of cellulose which have a higher viscosity in aqueous solutions.

Reaction products of alkylene oxides with cellulose ethers, or cellulose ethers containing acid radicals may also be used for the present purposes.

Besides the condensation products mentioned above and a cellulose ether the shaped products may contain filling materials. Suitable filling materials are salts adapted to absorb water of crystallization, especially salts of alkali metals such as sodium sulphate, sodium carbonates, bisodium phosphate, sodium pyrophosphate, borax and the like or insoluble materials which do not participate in the washing process such as silicic acid, infusorial silica, kaolin, clay, starch, and talcum powder, and pumice or fatty alcohols such as cetyl-alcohol and hydrocarbons of high molecular weight such as paraffin.

Materials may be also added which improve the washing process for instance wetting substances, synthetic detergents or calcium soap dissolving substances for instance sulfonated oils, alkylnaphthaline sulphuric acid salts, oleyltaurin sodium, sodiumhexametaphosphate, and other known detergents.

By way of example some processes are given below for the manufacture of shaped cakes in accordance with my invention, it being understood that the sequence of the individual steps of the processes may be changed or reversed.

*Example 1.*—A certain amount of a technical condensation product of lysalbinic acid with palmkerneloil acid containing about 40% of water is thoroughly mixed in a mixer with an equal amount of anhydrous sodium pyrophosphate. Diluted sulphuric acid is added until the reaction mixture shows a pH value equal to about 6, and thereafter a solution containing 50 grams of "Tylose" in a litre of water is added till a kneadable mass can be obtained. The thus obtained paste is shaped. The shaped cakes feel soap-like and are not used up faster than ordinary soap-cakes.

*Example 2.*—A certain amount of a condensation product of a low molecular amino acid which is obtained by completely hydrolyzing chrome leather waste with lauric acid is mixed with twice the amount of anhydrous bisodium phosphate. The thus obtained mixture shows a neutral reaction. The mixture is kneaded with a 5% solution of Tylose until a semi-liquid i. e. a more or less viscous paste is produced to which some talcum power is added. This mixture is shaped and dried. The shaped cakes have a high cleaning ability, produce a thick lather, they are stable and resistant against deformation and retain these properties during use.

Example 3.—The condensation product of lysine with coconut oil fatty acid is mixed with twice the amount of a mixture containing equal amounts of sodium sulphate and borax. The thus obtained mixture is treated as explained above in connection with Example 2.

Example 4.—A certain amount of the condensation product of gelatine with olein is mixed with an equal weight of sodium sulphate and with 10% of methyl cellulose. Then sodium carbonate is added until the mixture shows a neutral reaction and the thus obtained mixture is treated with equal amounts of wheat starch, shaped and dried.

The shaped cakes obtained in accordance with the above described processes have the advantage to show a neutral or slightly acid reaction and that they may also be used with water containing lime.

What I claim is:

1. A process of making washing materials comprising thoroughly mixing a condensation product of lysalbinic acid with palmitic acid with equal amounts by weight of anhydrous sodium pyrophosphate, adding an aqueous solution of sulphuric acid until the reaction mixture shows a pH of substantially 6, adding an aqueous solution of a mixture of cellulose ethers until a kneadable mass is obtained, shaping, and drying the thus obtained mixture.

2. Process for the manufacture of a washing material comprising mixing 50 parts by weight of a condensation product of gelatine with olein with 50 parts by weight of sodium sulphate and 5 parts by weight of methyl cellulose, neutralizing the thus obtained mixture by adding sodium carbonate, adding equal amounts of starch, shaping, and drying the thus obtained mixture.

MAX NASSAU.